US012037042B2

United States Patent
Diong et al.

(10) Patent No.: US 12,037,042 B2
(45) Date of Patent: Jul. 16, 2024

(54) VEHICLE WITH NON-PHYSICALLY COUPLED SECTIONS

(71) Applicants: Kennesaw State University Research and Services Foundation, Inc., Kennesaw, GA (US); Billy M. Diong, Sandy Springs, GA (US); Ying Wang, Marietta, GA (US); Jidong J. Yang, Johns Creek, GA (US)

(72) Inventors: Billy M. Diong, Sandy Springs, GA (US); Ying Wang, Marietta, GA (US); Jidong J. Yang, Johns Creek, GA (US)

(73) Assignee: Kennesaw State University Research and Service Foundation, Inc., Kennesaw, GA (US)

( * ) Notice: Subject to any disclaimer, the term of this patent is extended or adjusted under 35 U.S.C. 154(b) by 1539 days.

(21) Appl. No.: 16/322,605

(22) PCT Filed: Aug. 16, 2017

(86) PCT No.: PCT/US2017/047197
§ 371 (c)(1),
(2) Date: Feb. 1, 2019

(87) PCT Pub. No.: WO2018/035252
PCT Pub. Date: Feb. 22, 2018

(65) Prior Publication Data
US 2020/0207414 A1    Jul. 2, 2020

Related U.S. Application Data

(60) Provisional application No. 62/375,998, filed on Aug. 17, 2016.

(51) Int. Cl.
*B62D 59/00*    (2006.01)
*B62D 15/02*    (2006.01)
(Continued)

(52) U.S. Cl.
CPC .............. *B62D 15/026* (2013.01); *B60K 1/02* (2013.01); *B60K 7/0007* (2013.01);
(Continued)

(58) Field of Classification Search
CPC ...... B62D 15/026; B62D 33/06; B62D 59/00; B60K 1/02; B60K 7/0007;
(Continued)

(56) References Cited

U.S. PATENT DOCUMENTS 6,059,058 A * 5/2000 Dower .................... B60L 50/52
                                                           180/65.265
6,301,530 B1    10/2001 Tamura
(Continued)

FOREIGN PATENT DOCUMENTS

DE    102011012551 A1    8/2012
EP         0991046 A1    4/2000
(Continued)

OTHER PUBLICATIONS

Chen et al., Formation control of vehicles using leader-following consensus, 2013 16th IEEE Conference on Intelligent Transportation Systems, pp. 2071-2075, Oct. 2013.
(Continued)

*Primary Examiner* — Shardul D Patel
(74) *Attorney, Agent, or Firm* — Smith, Gambrell & Russell LLP; Michael J. Riesen; Indhira LaPuma (57) ABSTRACT

Systems and methods for a virtually coupled modular transportation system. A first module and a second module, in each for transporting a payload, comprise non-physically coupled vehicle sections. In an embodiment, a controller determines a target orientation between modules. In another embodiment, at least one position detection device determines an actual orientation between modules. A motor in at least one module may receive signals from the controller to
(Continued)

position the modules in the target orientation. A plurality of wheels on each module may receive an independent amount of torque to position the modules. In another embodiment, at least one module comprises a rechargeable electric motor.

21 Claims, 6 Drawing Sheets (51) Int. Cl.
*B60K 1/02* (2006.01)
*B60K 7/00* (2006.01)
*B60W 30/165* (2020.01)
*B62D 33/06* (2006.01)
*G05D 1/02* (2020.01)

(52) U.S. Cl.
CPC ........... *B60W 30/165* (2013.01); *B62D 33/06* (2013.01); *G05D 1/0293* (2013.01); *B60K 2007/0092* (2013.01); *B60W 2300/14* (2013.01); *G05D 2201/0213* (2013.01)

(58) Field of Classification Search
CPC ........ B60K 2007/0092; B60W 30/165; B60W 2300/14; G05D 1/0293; G05D 2201/0213; G08G 1/22
USPC ...................................................... 180/14.2
See application file for complete search history.

(56) References Cited

U.S. PATENT DOCUMENTS

| | | | |
|---|---|---|---|
| 7,177,749 B2 | 2/2007 | Sekiguchi | |
| 8,483,928 B2 | 7/2013 | Shida | |
| 8,600,609 B2 | 12/2013 | Holzmann et al. | |
| 8,626,406 B2* | 1/2014 | Schleicher | G05D 1/0295 701/50 |
| 8,989,995 B2 | 3/2015 | Shida | |
| 9,150,220 B2* | 10/2015 | Clarke | B60W 30/0953 |
| 9,187,095 B2 | 11/2015 | Gerdt | |
| 9,189,961 B2 | 11/2015 | Mehr et al. | |
| 11,378,981 B2* | 7/2022 | Harvey | G08G 1/20 |
| 2010/0044998 A1* | 2/2010 | Franchineau | B60D 1/36 280/491.1 |
| 2014/0074328 A1 | 3/2014 | Schaffler | |
| 2014/0246257 A1* | 9/2014 | Jacobsen | B62D 55/0655 180/14.2 |
| 2015/0151742 A1* | 6/2015 | Clarke | G06V 20/584 701/28 |
| 2015/0197296 A1 | 7/2015 | Leonard et al. | |
| 2015/0217819 A1 | 8/2015 | Pojidaev | |
| 2015/0375668 A1 | 12/2015 | Millet | |
| 2016/0045833 A1 | 2/2016 | Boyle | |
| 2016/0152243 A1 | 6/2016 | Ferren et al. | |
| 2016/0159350 A1 | 6/2016 | Pilutti et al. | |
| 2016/0176254 A1* | 6/2016 | Teppig, Jr. | B60F 3/0007 440/12.5 |
| 2019/0377364 A1* | 12/2019 | Harvey | G05D 1/0295 |

FOREIGN PATENT DOCUMENTS

| | | |
|---|---|---|
| EP | 3472030 A1 | 4/2019 |
| JP | 2008-191800 A | 8/2008 |
| WO | 2018/035252 A1 | 2/2018 |

OTHER PUBLICATIONS

Connect Cobb Corridor Environmental Assessment (Apr. 2015), 165 pages.
Gamage et al., Leader follower based formation control strategies for nonholonomic mobile robots: Design, implementation and experimental validation, Proceedings of the 2010 American Control Conference, pp. 224-229, Jun. 2010.
Lee, A leader-following formation control of a group of car-like mobile robots, ASME 2013 International Mechanical Engineering Congress and Exposition, Nov. 2013.
Peng et al., Leader-follower formation control of nonholonomic mobile robots based on a bioinspired neurodynamic based approach, Robotics and Autonomous Systems, vol. 61, No. 9, pp. 988-996, 2013.
Roldao et al., A leader-following trajectory generator with application to quad rotor formation flight, Robotics and Autonomous Systems, 62 (2014) 1597-1609.
Specifications for New Flyer (largest North American bus manufacturer), https://www.newflyer.com/?option%3A%3Acom_content&view=artic%21e&id=%27104&catid=2&itemid=167, Sep. 2017.
Zheng et al., An Autonomous Robot Tracking System through Fusing Vision with Sonar Measurements, accepted by 2016 International Joint Conference on Neural Networks.
International Patent Application No. PCT/US2017/047197; Int'l Preliminary Report on Patentability; dated Feb. 28, 2019; 8 pages.
European Supplementary Search Report and Search Opinion Received for EP Application No. 17842071.7, dated Feb. 11, 2020, 9 pages.
International Search Report and Written Opinion issued in Parent PCT Appln No. PCT/US2017/047197, dated Oct. 27, 2017.

* cited by examiner

Turning Radius plots (in meters)

36' Long SMFe-Bus

FIG. 3A

City Bus

FIG. 6 (A) Follower module showing 12 rows of passenger seats;
(B) Lead module with human driver at the front of the vehicle.

FIG. 7

VEHICLE WITH NON-PHYSICALLY COUPLED SECTIONS

CROSS-REFERENCE TO RELATED APPLICATIONS

This application claims priority to U.S. Ser. No. 62/375,998 filed Aug. 17, 2016, which is expressly incorporated by reference herein in its entirety.

An improved transportation system and method is described, comprising virtually coupled transportation modules. Virtually coupled modules indicates that the modules are linked by a virtual coupling controller so no mechanical attachments are necessary between the modules. The controller is in communication with the motor of the module to control the module's position, orientation, and speed.

The invention improves high capacity transit service to satisfy long-term regional mobility needs, e.g., for residents of a metropolitan area. The invention minimizes overall cost of a rapid transit system and maximizes performance and environmental compatibility.

Traditional transportation vehicles such as buses are limited in their ability to reduce cost and increase travel efficiency due to their size and current configurations. Even modular designs are limited due to, e.g., physical coupling or the need for additional operators.

The prior art lacks the features and benefits described herein of a vehicle having a plurality of non-physically coupled sections.

U.S. Pat. No. 7,177,749 discloses a vehicle driving support apparatus that executes an automatic follow-up control to a preceding vehicle traveling ahead of a vehicle. It includes intervehicle time calculation means (calculating an intervehicle time by dividing the intervehicle distance between the vehicle and the preceding vehicle by the vehicle speed), driver follow-up driving determination means (determining that the vehicle is in a follow-up driving state executed by the driver when a state in which the intervehicle time is set to a value within a set range continues for a set period of time in the state that the automatic follow-up control is canceled), target control value learning means (obtaining the driving information of the vehicle operated and learning a target control value of the automatic follow-up control based on the driving information when it is determined that the own vehicle is in the follow-up driving state executed by the driver), and automatic follow-up control execution means (outputting an actuation signal to a predetermined actuating section based on the learned target control value when the automatic follow-up control is executed). This method is dissimilar from the disclosed invention at least by requiring intervention by the driver of the following vehicle.

U.S. Pat. No. 8,483,928 discloses a follow-up run control device controlling a running state of a vehicle in a state where peripheral vehicles running before or behind the vehicle exist. It includes deviation acquiring means, i.e., acquiring information regarding a deviation between a relative positional relation and a target relative positional relation of the vehicle and the peripheral vehicles with respect to preceding vehicles running just before, and follow-up control amount calculating means, i.e., calculating a follow-up control amount of the vehicle to control the running state of the vehicle on the basis of the information regarding the deviations of a plurality of vehicles acquired by the deviation acquiring means. At least one distinction is that this requires activation by a human operator of the follow-up (following) vehicle.

U.S. Pat. No. 8,600,609 discloses a method for operating a longitudinal driver assist system of an automobile, in particular an adaptive cruise control system; environmental data of the automobile are evaluated with respect to travel in a longitudinal convoy with at least three automobiles which include the automobile and at least two additional automobiles driving immediately behind one another and each having an active longitudinal driver assist system. A convoy value is formed, and at least one operating parameter of the driver assist system is adapted depending on the convoy value. This is distinguished at least because it does not address simultaneous automatic speed and steering control of the following automobiles.

U.S. Pat. No. 8,989,995 discloses a row running control system that controls the running state of each vehicle by optimum control (LQ control) so that five vehicles, e.g., run in a row. Acceleration instruction values for the succeeding four vehicles among the five vehicles are determined as values minimizing predetermined evaluation functions, and the evaluation functions are calculated based on the errors of the distances between the respective vehicles, relative speeds between the respective vehicles, and the acceleration instruction values for the respective vehicles. It relies on using an LQ control algorithm to adjust the acceleration instruction values for the succeeding vehicles. At least one distinction between this disclosure and the inventive method is that it does not address simultaneous automatic speed and steering control of the following automobiles.

U.S. Pat. No. 9,150,220 discloses using cameras to provide autonomous navigation features. In one implementation, a driver assist navigation system is provided for a primary vehicle. The system may include at least one image capture device configured to acquire a plurality of images of an area in a vicinity of the primary vehicle; a data interface; and at least one processing device. The at least one processing device may be configured to locate in the plurality of images a leading vehicle; determine, based on the plurality of images, at least one action taken by the leading vehicle; and cause the primary vehicle to mimic the at least one action of the leading vehicle. This is distinguished at least by using only cameras for its operation, which are not sufficiently reliable in poor-weather and/or night-time conditions.

U.S. Pat. No. 9,187,095 discloses a method for entering a preceding vehicle autonomous following mode. It includes registering and identifying at least one preceding vehicle in front of a host vehicle by at least a first and a second sensor device, comparing the preceding vehicle with vehicle data in a remote database system, and upon a match establishing a communication channel between the preceding vehicle and the host vehicle, identifying to an operator of the host vehicle preceding vehicles with which the communication channel has been established, and obtaining from the operator a selection of a target vehicles to engage following of. Finally, autonomous following mode of the target vehicle is engaged, where a vehicle control system automatically controls at least the following three main functions of the host vehicle: forward propulsion, steering, and braking. This method is dissimilar from the inventive method at least because it requires activation by a human operator of the host (following) vehicle.

U.S. Pat. No. 9,189,961 discloses a method and system for autonomous tracking of a following vehicle on the track of a leading vehicle. A lead message is received by the following vehicle and rejected by the following vehicle or confirmed with a follow message. After receipt of the follow message, a first element of coordination information for coordination of the autonomous tracking is sent to the following vehicle by the leading vehicle. A second element of coordination information is detected for coordination of the autonomous tracking by environment sensors of the following vehicle on the basis of movements of the leading vehicle. The first and second elements of coordination information are compared by the following vehicle. In the case of a matching comparison result, the autonomous tracking is performed corresponding to the first and second elements of coordination information and, in the case of a deviating comparison result, the autonomous tracking is ended. This is distinguished from the inventive method at least in that this method requires intervention by an (human) operator of the following vehicle.

U.S. Patent Publication No. 2016/0159350 discloses a vehicle system that includes a sensor that detects a speed of at least one nearby vehicle and outputs a speed signal representing the speed of the at least one nearby vehicle. It also includes a processing device programmed to determine a set point speed based on the speed signal output by the sensor. The processing device generates a command signal to control a host vehicle in accordance with the set point speed. This is distinguished from the inventive method at least because it does not address simultaneous automatic speed and steering control of the host (following) vehicle.

The following publications disclose modular or detachable vehicles: U.S. Publication Nos. 2015/0197296, 2015/0217819, 2015/0375668, 2016/0045833, and 2016/0152243 are distinguished at least because their vehicle modules are required to be physically attached to each other during mobile operation.

Many early robot leader-follower formation control references focus on developing a linear or nonlinear trajectory-tracking controller so that a follower robot can track the leader robot properly. To guarantee control performance, usually a model of the leader-follower system was derived and employed to develop a motion controller for the robot. For example, Gamage et al. (Leader follower based formation control strategies for nonholonomic mobile robots: Design, implementation and experimental validation, Proceedings of the 2010 American Control Conference, pp. 224-229, June 2010) proposed a formation control strategy for nonholonomic mobile robots. Through converting the formation control task into separate trajectory control tasks of the follower robots and utilizing the dynamic feedback linearization technique, the formation's stability and disturbance tolerance were obtained. Chen et al. (Formation control of vehicles using leader-following consensus, 2013 16th IEEE Conference on Intelligent Transportation Systems, pp. 2071-2075, October 2013) presented a constant spacing policy for this formation control problem with the objective to develop a control strategy to make all vehicles have a constant velocity and maintain a constant spacing. The simulation results showed that the proposed system could achieve input-to-stability (ISS). Because the formation control model is quite nonlinear, the Lyapunov stability theorem was utilized to develop a nonlinear controller. Lee (A leader-following formation control of a group of car-like mobile robots, ASME 2013 International Mechanical Engineering Congress and Exposition, November 2013) proposed a leader-follower formation control strategy for a group of car-like mobile robots. The control task was to calculate the desired driving force and steering torque for each robot. To that end, the Lyapunov stability theorem and the loop shaping method were used. As a result, the proposed control approach could guarantee asymptotic stability under certain conditions. Roldao et al. (A leader-following trajectory generator with application to quadrotor formation flight, Robotics and Autonomous Systems, 62 (2014) 1597-1609) proposed a Lyapunov-based nonlinear controller for a leader-following trajectory generator with application to quadrotor formation flight. The model-free "soft control" or "soft computing" approach has recently gained attention for developing control strategies to tackle challenging nonlinear control problems. For example, Peng et al. (Leader-follower formation control of nonholonomic mobile robots based on a bioinspired neurodynamic based approach, Robotics and Autonomous Systems, vol. 61, no. 9, pp. 988-996, 2013.) proposed a bio-inspired neurodynamic based approach for leader-follower formation control of nonholonomic mobile robots. The backstepping technique was used to implement the formation control system. Zheng et al. (An Autonomous Robot Tracking System through Fusing Vision with Sonar Measurements, accepted by 2016 International Joint Conference on Neural Networks) developed a leader-follower formation control system using the fusion of vision and sonar-acquired distance information by a trained neural network to cause the follower robot to adjust its speed and heading angle according to the leader robot's movements.

Among other distinctions, none disclose a human manually driving the lead vehicle.

BRIEF DESCRIPTION OF THE DRAWINGS

FIGS. 3A and 3B illustrate turning radius plots for comparison between an embodiment of the present disclosure and a city bus. FIG. 3B depicts a turning radius plot for a city bus.

The inventive method, termed slim bus rapid transit (BRT) and referred to as SlimBRT is a flexible transit vehicle that can operate in dedicated guideways, high occupancy vehicle (HOV) lanes, or mixed traffic. SlimBRT is based on a novel vehicle called the Slim-Modular-Flexible-Electric bus ("SMFe-bus") having features of (1) narrower width (25-50% slimmer than a regular bus, most common transit buses are 40 feet-60 feet in length, about 102 inches in width, and accommodate 50-60 passengers (Specifications for New Flyer (largest North American bus manufacturer) buses—https://www.newflyer.com/ index.php?option=com_content&view=article&id=104&catid=2&itemid=167]), to require less right of way and allow for road expansion and construction costs to be reduced; (2) a lead module with a driver cab and one or more driverless follower modules or cars trailing behind it, to reduce the vehicle's turning radius, thus minimizing right-of-way requirements at intersections; and (3) one or more follower modules that are easily attached and detached from the preceding module by "virtual coupling" to meet varying demand by time of day with optimized operations, providing a much lower operational cost. As only one example, a $500 million "Connect Cobb" project in the metropolitan Atlanta area is projected to save about 19 to 27 million dollars. In embodiments, the minimum distance between modules will occur when the modules are stopped (e.g., bus stops, traffic lights, etc.). In one exemplary and non-limiting embodiment, the minimum distance may be 0.5 meters. In embodiments, the distance between modules will vary depending on the modules' speeds. The follower module will be automatically controlled to maintain a time headway or gap between it and the preceding module that is equivalent to a specified time separation, e.g., 0.4 seconds. In this embodiment it will take the follower module 0.4 s to cover the distance to the lead module should the latter come to a sudden and complete stop, and the former not brake. The maximum distance between modules will occur at the vehicle's top operating speed; an exemplary but non-limiting example of this speed may be 100 km/h (just over 60 mph), i.e., a maximum distance between modules of 11 m (36 ft.). In one embodiment, there is an increase in the time separation when the roads are wet or slick, for example.

Moreover, given the smaller size of the modules, each of them are self-propelled by in-wheel electric motors, which will allow the modules to better negotiate turns while being more friendly to the environment than using fossil-fuel engines.

A vehicle's turning radius is mainly dependent on its wheelbase (distance between front and rear wheels), which is related to its length. The inventive design that requires a narrower bus, so any dedicated bus lanes can be built narrower, requires a longer bus to maintain a similar passenger capacity, which however leads to an unacceptably large turning radius. Hence the inventive design featuring shorter, decoupled bus sections, i.e., modules, addresses turning radius.

Safety considerations and vehicle performance issues may arise if another vehicle drives between modules. However, one measure to address these issues is a preventive approach. For example, the modular vehicle may have an LED sign on the back of the lead module warning, "Do not step foot or drive into the space behind this bus module and the following bus module," and have an LED sign on the front of the follower module warning: "If you are reading this in your rear-view mirror, please switch lanes." Additionally, flashing lights on the ends of extended arms, dedicated bus lanes, public awareness and education, laws imposing fines, etc., may minimize encroachments into that space, or zone, between modules.

Another measure to address this is a remedial approach, e.g., have the following module switch over to fully autonomous driving mode, instead of semi-autonomous following mode, until such time when all its sensors have re-acquired the preceding module and there is no intervening object.

In one embodiment, software algorithms are implemented to enable follower modules to switch over to fully autonomous driving mode temporarily when communication with the lead module is interrupted, or if the follower module loses track of the lead module in an abnormal situation. This may be particularly useful, e.g., in situations where human drivers position their vehicles between lead and follower modules, and the virtual coupling between the modules is interrupted. In such cases, the follower module can attempt to continue tracking the lead module using its camera, radar, and lidar sensors, for example. The lead module will also slow, encouraging the interceding vehicle to pass.

However, in situations where contact between the modules is completely lost, independent navigation of the follower module is needed. The sensor suite on the follower module may then switch to identifying surrounding vehicles and detecting lane boundaries. As a result, the follower module will continue driving in its lane, which ideally is a dedicated lane, before regaining contact with the lead module. If the follower module fails to reach its lead before a turn, a lane tracking failure, or other incident, the follower will pull over onto the road shoulder or other area for safety. Additionally, the follower module must be capable of safely changing lanes and moving as far as safely possible onto the shoulder. In such a situation, the follower can then wait until its lead returns, when the next scheduled vehicle comes by, etc., whichever option impacts total passenger delay the least. Software algorithms are implemented to enable follower modules to resume communication and normal operation when communication with the lead module is re-established.

Figure 1A:
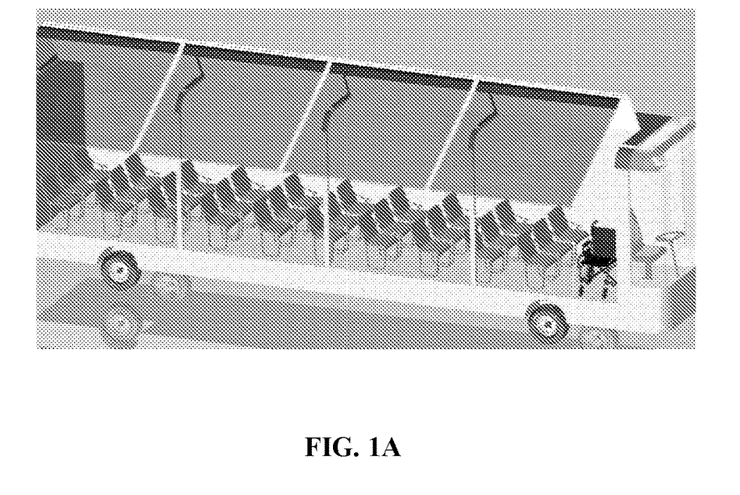
FIGS. 1A-D illustrate an example transportation vehicle, with FIGS. 1A, 1B, and 1C detailing the transportation modules and various features of a full view of a lead module (FIG. 1A), the lead and follower module (FIG. 1B), and a contemporary design of a module (FIG. 1C), and components of a scaled-down prototype design of an example transportation system (FIG. 1D).
Figure 1B:
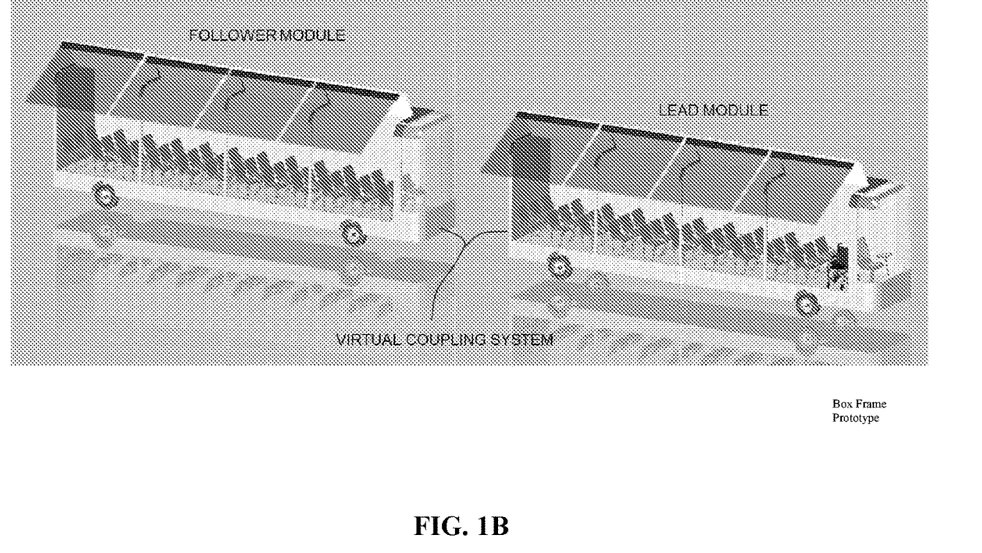
Figure 1C:
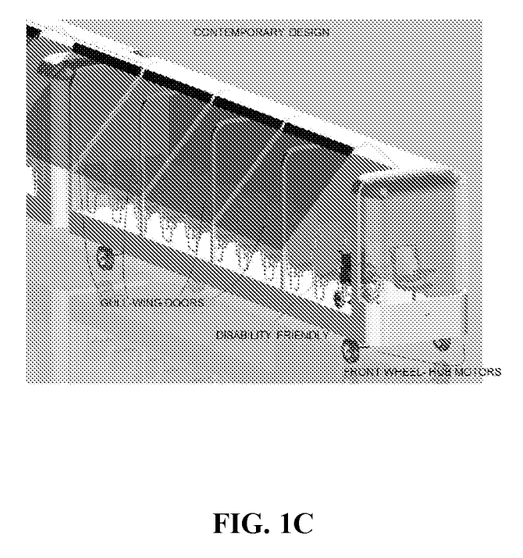

As depicted in FIGS. 1A-C, one embodiment includes a lead module and a follower module. In one embodiment, the vehicle is composed of 2-5 modules. In one embodiment, the vehicle is composed of 5 modules. In one embodiment, the vehicle is composed of 4 modules. In one embodiment, the vehicle is composed of 3 modules. In one embodiment, the overall length of the virtually coupled vehicle is that which is practical in city traffic. Each module is capable of carrying a plurality of passengers, and is connected by a virtual coupling system. Modules may be rectangular in shape, and may further comprise a drivers cab. Additional features of the inventive system include in-wheel hub motor technology, gull-wing doors, and disability accommodations rendering the vehicle ADA compliant.

In one embodiment depicted in FIGS. 1A-C, the vehicle doors may be about 7 feet wide with 4 inch separations between them. There is also a plurality of rows of seats for passengers. In one embodiment, the gull-wing (also known as falcon-wing) type door is used which can significantly reduce boarding and alighting times. Alternative embodiments include but are not limited to roll-up garage type doors. In another embodiment, there are four doors on a side. However, other numbers of doors may be used, in accordance to design and cost considerations, for example. The fuel type for these vehicles may be battery or electric. In an embodiment, the capacity is 105 per vehicle or bus, having one lead, and two follower modules.

Figure 1D:
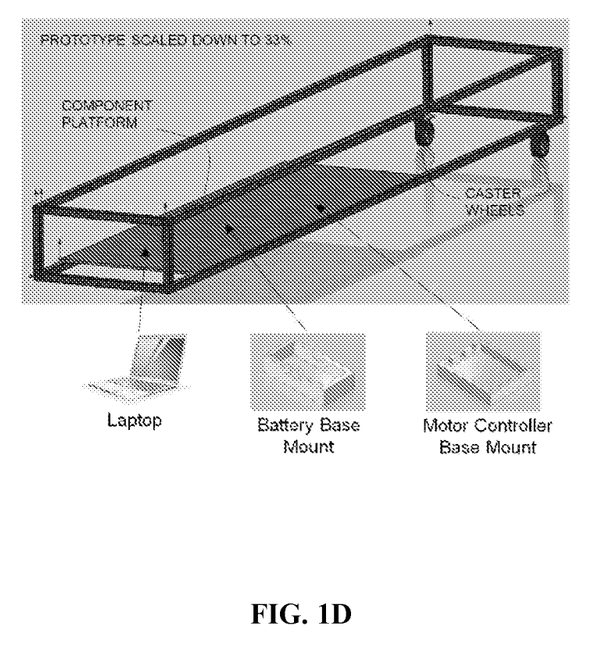

FIG. 1D shows the SMFe-bus prototype at a ⅓-scale. The prototype allows testing of the functionality of the hub motors, virtual coupling of the modules, and the performance of the vehicle under various scenarios. As illustrated, the prototype comprises a rectangular body, similar to the embodiments illustrated in FIGS. 1A-C, and additionally contains a component platform on which a laptop, battery base mount, and motor controller base mount may be placed. These components comprise various hardware and software components to virtually coupled modules in accord with one embodiment. The prototype further comprises steerable wheels to achieve adequate maneuverability of the module.

In another embodiment, a BRT system may use rubber-tired vehicles operating on dedicated guideways, HOV lanes, or in mixed traffic. The BRT system may use signal-priority queue-jumper lanes to increase operation efficiency and reliability.

Figure 2A:
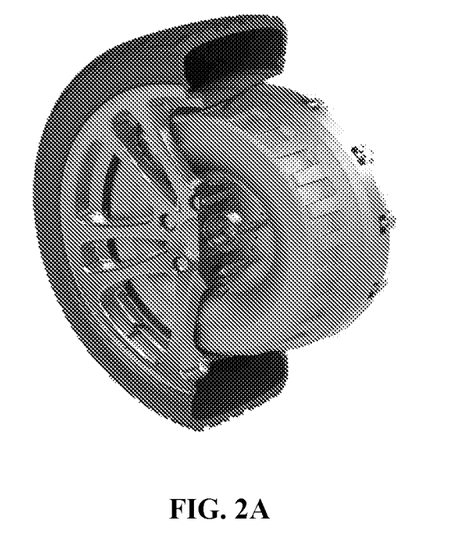
FIGS. 2A and 2B illustrate an example wheel component and structure, in accordance with the subject of the invention, with FIG. 2A showing a cut section of an assembled wheel and FIG. 2B showing individual components of a wheel.
Figure 2B:
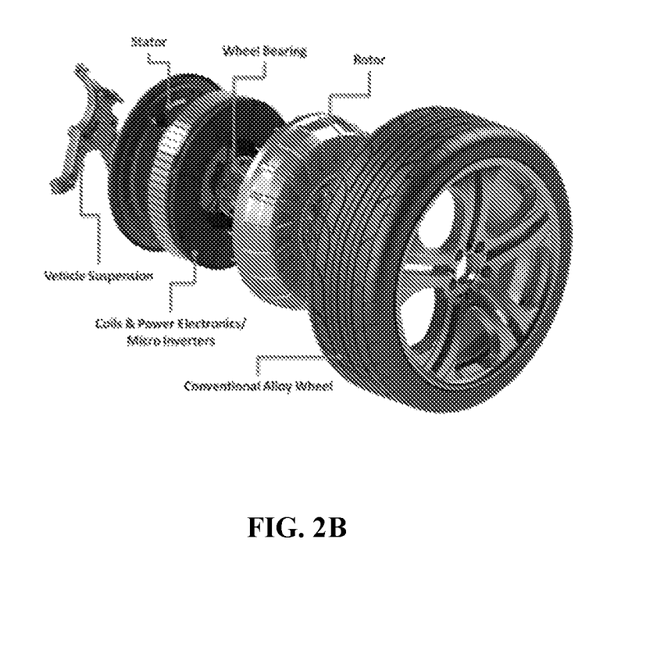

FIGS. 2A and 2B show an example embodiment of the wheels that may be used in the bus and other vehicle embodiments. FIG. 2A illustrates a cross-sectional view of the wheel, exposing the rotor within. FIG. 2B illustrates the various components of an exemplary wheel system, which comprise a wheel, a rotor, wheel bearing, power electronics and micro inverters, and a stator attached to vehicle suspension. In one embodiment, the wheel may be a conventional alloy wheel.

Exemplary buses can be driven by electric hub motors that are mounted inside the front wheels on each module. These motors allow each wheel to be driven independently of the other wheels, eliminating the need for complex differential and vehicle stability systems. The torque delivered to each wheel can thus be directly controlled using torque vectoring, a method that increases the torque produced by the outer wheel(s) to enhance the vehicle's road handling ability during cornering. In addition, hub motors can greatly reduce space needed for powertrain components allowing less accommodations being needed for the chassis and body design.

Figure 3A:
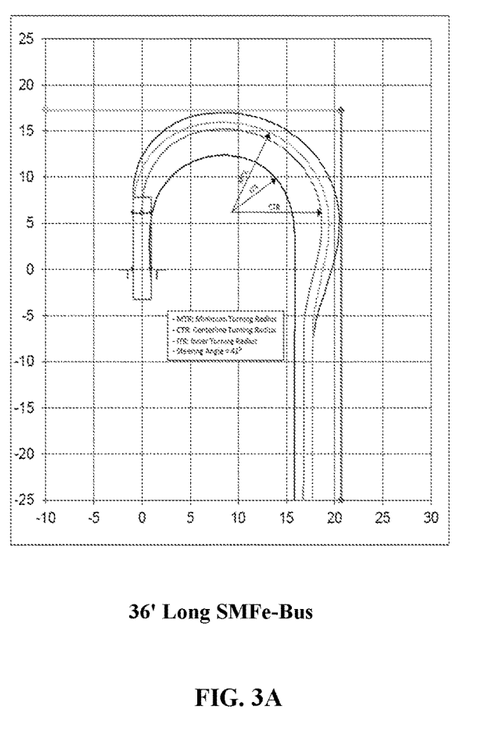
FIG. 3A depicts a turning radius plot for an exemplary slim modular flexible electric bus.
Figure 3B:
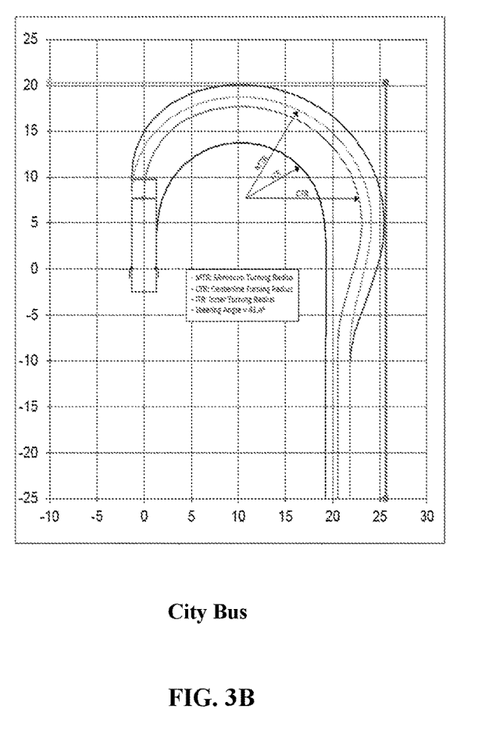

FIGS. 3A and 3B show improvements using embodiments of the modular buses in turning radius, compared to traditional buses. The minimum turning radius of a vehicle is defined as the radius of the smallest complete turn (U-turn) a vehicle can make. It is measured from the center point of the circle to the outermost wheel on the vehicle. Turning radius calculations were configured using data that were first configured to match the turning radius of a city transit bus, documented by the American Association of State Highway and Transportation Officials. The data were then used to determine the turning radius values for the 36 ft. SMFe-bus version.

Table 1 shows that these values are less than that of existing buses, which allows for the possibility of having SMF3-bus routes go through, i.e., turn at, narrower intersections where existing bus routes cannot go.

TABLE 1

Turning Radius Comparisons (in feet)

| Vehicle | Length | Wheel-base | Max Steering Angle | Min. Turning Radius | Center-line Turning Radius | Inner Turning Radius |
|---|---|---|---|---|---|---|
| Passenger Car* | 19' | 11.0' | 31.6° | 23.8' | 21.0' | 14.4' |
| Articulated Bus* | 60' | 41.4' | 38.3° | 39.4' | 35.5' | 21.3' |
| City Bus* | 40' | 25.0' | 41.4° | 41.6' | 37.8' | 24.5' |
| SMFe-bus | 27' | 15' | 41.0° | 27.2' | 25.4' | 15.4' |
| SMFe-bus | 36' | 20' | 41.0° | 33.1' | 31.5' | 20.6' |

*Data from American Association of State Highway and Transportation Officials document As illustrated in the turning radius plots of FIGS. 3A-B, the exemplary Slim-Modular Flexible-Electric bus ("SMFe-bus") significantly reduces the turning radius, and the length and width needed for a U-turn. As Table 1 demonstrates, the buses in accord with the inventive embodiments have a shorter length, smaller wheel base, and a significantly reduced minimum, centerline, and inner turning radius. The result is improved operation and navigation on existing highways. The SMFe buses can operate on highways, roads, and other lanes with narrower widths and tighter navigation conditions.

Example BRT System

Figure 4:
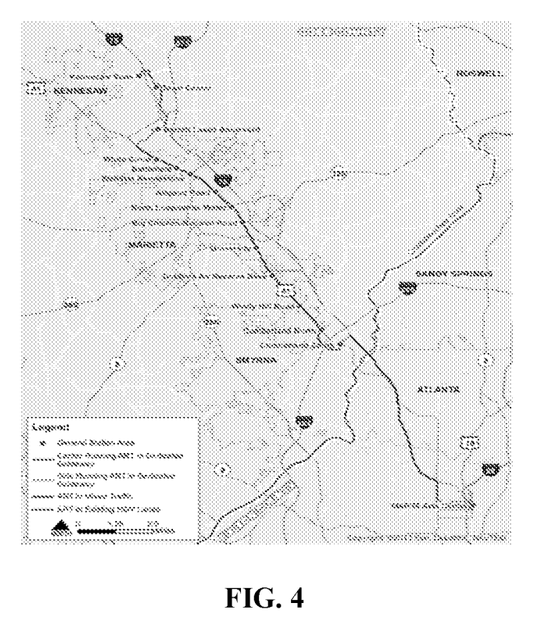
FIG. 4 illustrates a proposed transportation route, on which embodiments of the present invention may be implemented.

Embodiments of the present invention, as described herein, may be implemented in current transit routes and metropolitan areas, as well as future transportation systems. For example, in the metropolitan Atlanta area, Cobb County's Department of Transportation is proposing a BRT system [[Comments]Connect Cobb Corridor Environmental Assessment (April 2015), https://cobbcounty.org/images/documents/dot/studies/ConnectCobb/EA/Connect_Cobb_Corridor_EA_April_2015_FINAL.pdf, accessed 9 Jan. 2017] called Connect Cobb, which will be composed of a corridor running from Kennesaw State University, Kennesaw Georgia USA to Midtown Atlanta Ga. USA. The route will be 25.3 miles with 15 stops, shown in FIG. 4.

Figure 5:
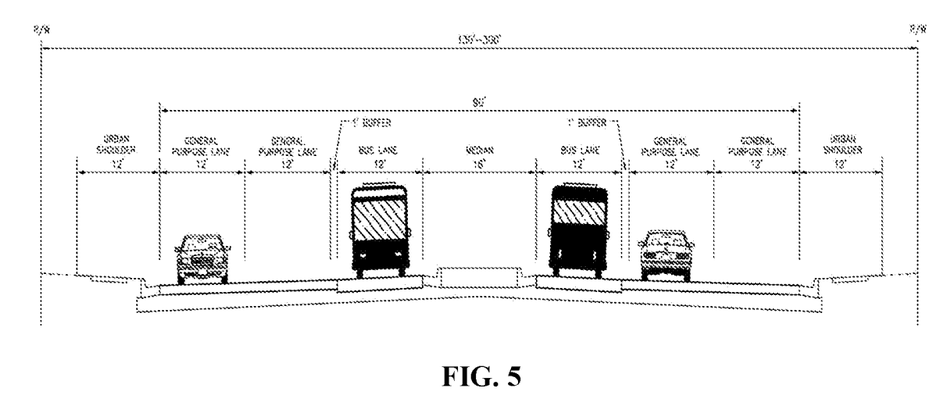
FIG. 5 illustrates a proposed highway and bus line, on which embodiments of the present invention may be implemented.

FIG. 5 illustrates a proposed roadway, including lane widths and shoulders. For example, total highway width will be between 130-300 feet, with at least three 12-foot wide lanes and one 12-foot wide shoulder per direction, separated by a 16-foot wide median. The lane nearest the median on both sides is a dedicated bus lane, with an additional one-foot buffer between the next adjacent general purpose lane. The buses and modular transportation embodiments described herein may be implemented on the proposed roadway.

Additionally, the SlimBRT system will have cost savings, if applied. For example, the SlimBRT is based on a novel vehicle, termed Slim-Modular-Flexible-Electric bus ("SMFe-bus"), having features in accordance with the present invention, as described herein. Its narrower width (25-50% slimmer than a regular bus), requires less right of way, allows for road expansion and construction costs to be reduced. The SMFe-bus has a lead module with a driver cab, and one or more driverless follower modules/cars trailing behind it; this reduces the vehicle's turning radius. Its follower modules can be easily attached and detached from the preceding module by "virtual coupling" as described herein, to meet varying demand by time of day with optimized operations, thus reducing operational costs.

Moreover, given the smaller size of the modules, each of them are self-propelled by in-wheel electric motors, which will allow the modules to better negotiate turns while being more friendly to the environment than using fossil-fuel engines.

Figure 6:
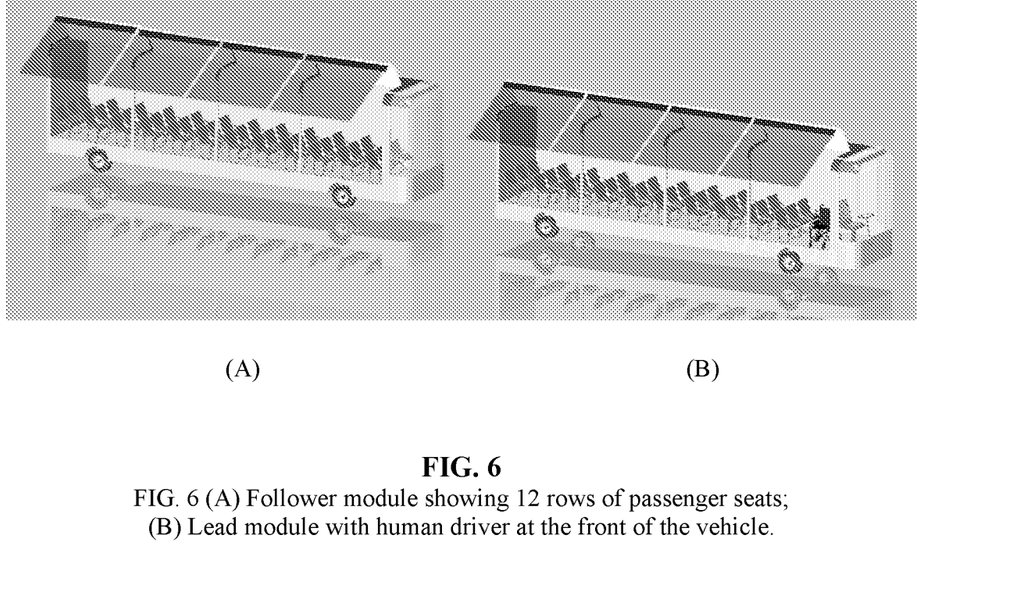
FIG. 6 illustrates an example follower module (A), and lead module (B), in accordance with the subject of the invention.

FIGS. 6A-B show several features and advantages to the modular design. The features include a reduction of the number of drivers needed to operate the modular vehicles. For example, FIG. 6B shows a lead module with a driver cab, while the follower module (FIG. 6A) is driverless. Each module depicts twelve rows of passengers (36 passenger version), along with a handicap-accessible space in the lead module. The gull-wing styled doors and individually controlled wheels are also depicted. A virtual coupling controller links the modules together, so no mechanical attachments are necessary between the modules.

EXAMPLE

The SMFe-bus design was performed for three different bus lengths. The inventive design improves concepts such as environmental friendliness. For example, the design is greener, emits no exhaust gasses, is modular, compact, and weighs less compared to other such vehicles. The following table generally compares the SMFe-bus to the arterial rapid transit (ART) bus, the name preferred by Cobb Country to BRT.

TABLE 2

Comparison between ART Bus and SMFe-bus

| | ART Bus Specifications | SMFe-bus Specifications |
|---|---|---|
| Fuel Type | Compressed Natural Gas or Diesel-Electric Hybrid | Battery Electric |
| Capacity | 110 (60 seated plus 50 standing) | 105 (24 + 27 + 27 + 27 seated, 4 modules, 9 rows, with 1 driver or 3 passengers seated per row), or 105 (33 + 36 + 36 seated, 3 modules, 12 rows, with 1 driver or 3 passengers seated per row) |
| Length (ft) | 62 | 27 to 36 |
| Width (ft) | 8.5 | 6 to 6.25 |
| Height (ft) | 11 | 10 |
| Turning Radius (ft) | 39 | 33.1 (for each 36' long module) |
| Weight (lb) | 68000 | 21775 to 29032 |
| Fare Collection | At station | At station |
| Max Speed (mph) | 60 | 60 |
| Door location | Both Sides | One side |

The SMFe-bus design features include all-electric propulsion: two hub motors (132-176 HP) or four hub motors (66-88 HP); weight of 21,7774 lb. to 29,032 lb. (27 ft. to 36 ft. length range); battery capacity of 600 Ah capacity battery pack (to achieve two round trips).

Figure 7:
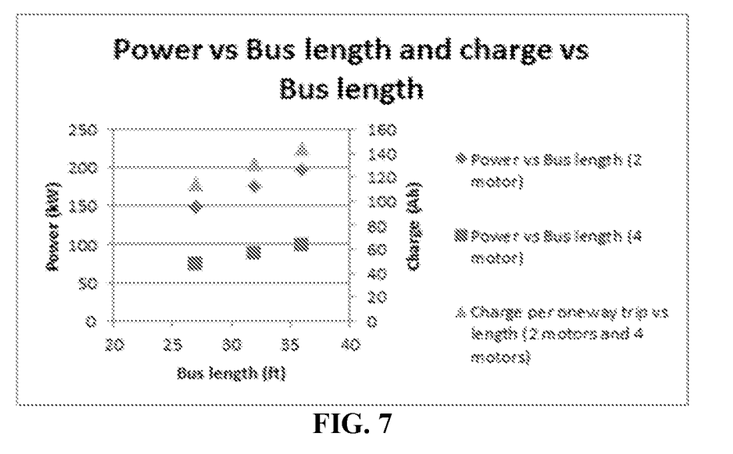
FIG. 7 plots power (kW) vs. bus length (ft), and charge (Ah) vs. bus length (ft) for various motor configurations in an embodiment of the present disclosure.

The electric charge and power requirements calculated for the three different module lengths (27 feet, 33 feet, and 36 feet) considered are plotted in FIG. 7. These values informed the proper sizing of the motors (HP) and the battery pack (Ah).

The SMFe-bus charging is accomplished as follows. A quick charge is performed during layovers at terminals or while waiting for passengers to fill modules (allowing the buses to run all day). A full charge is performed at night. Different chargers are implemented to quickly charge during stops. The following table (Table 3) shows charging times. Levels 1 and 2 charging use single- or three-phase AC supply and can deliver a power rating between 2 kW-20 kW. Level 3 chargers require a three-phase AC supply and provide a power rating from 20 kW-240 kW.

TABLE 3

Charging Times for Different Levels of Chargers

| Motor voltage (Vdc) | Motor Power rating (kW) | Battery Capacity (kWh) | 80% of 222 kWh | Charger Efficiency | Level 1 (2 kW) Hours to 80% | Level 2 (2 kW 3-phase) Hours to 80% | Level 3 (50 kW DC) Hours to 80% |
|---|---|---|---|---|---|---|---|
| 370 | 90 | 222 | 17.8 | 100% | 8.8 | 0.88 | 0.352 |

A scaled and functional model of the proposed SMFe-bus permits better estimations of both vehicle cost and vehicle weight to render calculations more precise. These allow for the size of the motors (HP) and the battery pack (Ah) to be fine-tuned so as to maximize the performance-to-cost ratio of the SMF3-bus' power and propulsion system.

Additional embodiments and examples include a modular transportation system comprising a first module to transport a first payload and a second module to transport a second payload, with the second module virtually coupled to the first module. Additional components could include a virtual coupling controller, which could determine a target orientation of the second module relative to the first module, and position the second module in the target orientation. The target orientation could be based on one or more of a velocity of the first module, an acceleration of the first module, a vector between the first module and the second module, and a rate of change of the vector between the first module and the second module. The modular transportation system could further comprise a first position detection device to transmit a first position of the first module to the virtual coupling controller, where the virtual coupling controller determines an actual orientation of the second module relative to the first module, based on the first position. The first position may be relative to a second position of the second module. The modular transportation system may further comprise a first motor to move the second module based on a first control signal output from the virtual coupling controller, where the virtual coupling controller determines the first control signal based on a difference between the target orientation and the actual orientation. The modular transportation system may further comprise a second motor to move the second module, where the difference is an error vector comprising a first dimension and a second dimension, the virtual coupling controller outputs a second control signal to the second motor, the first control signal is based on a magnitude of the error vector in the first dimension, and the second control signal is based on the magnitude of the error vector in the second dimension. The modular transportation system may further comprise a second position detection device to transmit a second position of the second module to the virtual coupling controller, where the first position detection device is located in the first module, the second position detection device is located in the second module, and the virtual coupling controller determines the actual orientation based on a difference between the first position and the second position. The modular transportation system may have the first module as a lead module and the second module as a follower module. The first module may comprise a driver's cab. The second module may comprise a plurality of wheels, where each wheel receives an independent amount of torque. The modular transportation system may further comprise a virtual coupling controller to determine a target orientation of the second module relative to the first module, and control a position of the second module to maintain the second module in the target orientation by controlling the amount of torque provided to each wheel. The modular transportation system may further comprise a power source, and a power storage device, where the power storage device is coupled to the power source in response to the first module stopping at a predetermined stopping point. The inventive method may transport a payload by virtually coupling a first module to a second module. The first module may transport a first payload, and the second module may transport a second payload. A target orientation of the second module, relative to the first module, may be determined by a virtual coupling controller. The target orientation may be based on one or more of a velocity of the first module, an acceleration of the first module, a vector between the first module and the second module, and a rate of change of the vector between the first module and the second module. The second module may be positioned in the target orientation. A first position of the first module may be transmitted to the virtual coupling controller using a first position detection device. A second position of the second module to the virtual coupling controller may be transmitted using a second position detection device, where the virtual coupling controller determines the actual orientation based on a difference between the first position and the second position. The second module may move with a first motor and based on a first control signal output from the virtual coupling controller, where the virtual coupling controller determines the first signal based on a difference between the target orientation and an actual orientation. The second module may move with a second motor based on one or more of the difference of an error vector comprising a first dimension and a second dimension, where the virtual coupling controller outputs a second control signal to the second motor, the first control signal is based on a magnitude of the error vector in the first dimension, and the second control signal is based on the magnitude of the error vector in the second dimension. Each module may comprise a plurality of wheels, and each wheel may receive an independent amount of torque. At least one module may comprise a rechargeable electric motor.

While certain example embodiments have been described, these embodiments have been presented by way of example only and are not intended to limit the scope of the disclosure. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of certain of the disclosure. The references cited are expressly incorporated by reference herein in their entirety.

What is claimed is:

1. A modular transportation system comprising:
a first transportation module to transport a first payload;
a second transportation module to transport a second payload, where the second transportation module is virtually coupled to the first transportation module and is in a semi-autonomous following mode; and
a virtual coupling controller configured to determine a target orientation of the second transportation module relative to the first transportation module, and position the second transportation module in the target orientation, where the second transportation module is configured to temporarily switch to a fully autonomous driving mode when an interruption of the virtual coupling of the first transportation module and the second transportation module is detected by the virtual coupling controller.

2. The modular transportation system of claim 1, where the target orientation is based on one or more of: a velocity of the first module, an acceleration of the first module, a vector between the first transportation module and the second module, and a rate of change of the vector between the first transportation module and the second transportation module.

3. The modular transportation system of claim 1, further comprising a first position detection device to transmit a first position of the first transportation module to the virtual coupling controller, where the virtual coupling controller determines an actual orientation of the second transportation module relative to the first transportation module, based on the first position.

4. The modular transportation system of claim 3, where the first position is relative to a second position of the second transportation module.

5. The modular transportation system of claim 3, further comprising a first motor to move the second transportation module based on a first control signal output from the virtual coupling controller, where the virtual coupling controller determines the first control signal based on a difference between the target orientation and the actual orientation.

6. The modular transportation system of claim 5, further comprising a second motor to move the second transportation module, where the difference is an error vector comprising a first dimension and a second dimension, the virtual coupling controller outputs a second control signal to the second motor, the first control signal is based on a magnitude of the error vector in the first dimension, and the second control signal is based on the magnitude of the error vector in the second dimension.

7. The modular transportation system of claim 3, further comprising:
a second position detection device to transmit a second position of the second transportation module to the virtual coupling controller, where
the first position detection device is located in the first transportation module,
the second position detection device is located in the second transportation module, and
the virtual coupling controller determines the actual orientation based on a difference between the first position and the second position.

8. The modular transportation system of claim 1, where in the first transportation module is a lead transportation module and comprises a driver's cab, and at least the second transportation module is a follower transportation module.

9. The modular transportation system of claim 1, where the second transportation module comprises a plurality of wheels, where each wheel receives an independent amount of torque.

10. The modular transportation system of claim 9, further comprising a virtual coupling controller to determine a target orientation of the second transportation module relative to the first transportation module, and control a position of the second transportation module to maintain the second module in the target orientation by controlling the amount of torque provided to each wheel.

11. The modular transportation system of claim 1, further comprising a power source and a power storage device, where the power storage device is coupled to the power source in response to the first transportation module stopping at a predetermined stopping point.

12. The modular transportation system of claim 1, where the second transportation module utilizes at least one of a camera, radar, or one or more lidar sensors to attempt to track the first transportation module during the interruption of the virtual coupling.

13. The modular transportation system of claim 1, wherein the detected interruption is indicative of a loss of detection of the first transportation module by at least one sensor located on the second transportation module.

14. A method for transporting a payload, the method comprising:
virtually coupling, by a virtual coupling controller, a first transportation module to a second transportation module, where the first transportation module transports a first payload, and the second transportation module transports a second payload;
determining, by the virtual coupling controller, a target orientation of the second transportation module relative to the first transportation module, where the target orientation is based on one or more of a velocity of the first module, an acceleration of the first transportation module a vector between the first transportation module and the second transportation module, and a rate of change of the vector between the first transportation module and the second transportation module; and
positioning the second transportation module in the target orientation,
wherein the second transportation module is configured to detect when an interruption of the virtual coupling of the first transportation module and the second transportation module is detected by the virtual coupling controller, and
wherein the detected interruption is indicative of a loss of detection of the first transportation module by at least one sensor located on the second transportation module.

15. The method of claim 14, further comprising transmitting a first position of the first transportation module to the virtual coupling controller using a first position detection device.

16. The method of claim 15, further comprising transmitting a second position of the second transportation module to the virtual coupling controller, using a second position detection device where the virtual coupling controller determines the actual orientation based on a difference between the first position and the second position.

17. The method of claim 14, further comprising moving, with a first motor, the second transportation module, based on a first control signal output from the virtual coupling controller where the virtual coupling controller determines the first signal based on a difference between the target orientation and an actual orientation.

18. The method of claim 17, further comprising moving, with a second motor, the second transportation module based on an error vector comprising a first dimension and a second dimension, where the virtual coupling controller outputs a second control signal to the second motor, the first control signal is based on a magnitude of the error vector in the first dimension, and the second control signal is based on the magnitude of the error vector in the second dimension.

19. The method of claim 14, where each of the first module and the second transportation module comprises a plurality of wheels, where each wheel receives an independent amount of torque.

20. The method of claim 14, where at least one of the first module and the second transportation module comprises a rechargeable electric motor.

21. A modular transportation system comprising:
a first transportation module to transport a first payload;
a second transportation module to transport a second payload, where the second transportation module is virtually coupled to the first transportation module and is in a semi-autonomous following mode; and
a virtual coupling controller configured to determine a target orientation of the second transportation module relative to the first transportation module, and position the second transportation module in the target orientation,
wherein the second transportation module is configured to detect when an interruption of the virtual coupling of the first transportation module and the second transportation module is detected by the virtual coupling controller, and
wherein the detected interruption is indicative of a loss of detection of the first transportation module by at least one sensor located on the second transportation module.

* * * * *